United States Patent
Bowler et al.

(10) Patent No.: US 8,732,449 B2
(45) Date of Patent: *May 20, 2014

(54) CHANGING THE PERSONALITY OF A DEVICE BY INTERCEPTING REQUESTS FOR PERSONALITY INFORMATION

(75) Inventors: Richard A. Bowler, Portland, OR (US); Michelle S. Christopher, Hillsboro, OR (US); Gordon A. Rielly, Westport (CA); Erik Mork, Portland, OR (US)

(73) Assignee: Tranxition Corporation, Portland, OR (US)

( * ) Notice: Subject to any disclaimer, the term of this patent is extended or adjusted under 35 U.S.C. 154(b) by 181 days.

This patent is subject to a terminal disclaimer.

(21) Appl. No.: 12/779,703

(22) Filed: May 13, 2010

(65) Prior Publication Data

US 2011/0087868 A1 Apr. 14, 2011

Related U.S. Application Data

(63) Continuation of application No. 11/847,024, filed on Aug. 29, 2007, now abandoned, which is a continuation of application No. 11/249,750, filed on Oct. 13, 2005, now Pat. No. 7,293,170.

(60) Provisional application No. 60/688,226, filed on Jun. 6, 2005.

(51) Int. Cl.
*G06F 9/00* (2006.01)

(52) U.S. Cl.
USPC .............................................. 713/100; 713/1

(58) Field of Classification Search
USPC ..................................................... 713/100, 1
See application file for complete search history.

(56) References Cited

U.S. PATENT DOCUMENTS

| 5,287,505 | A | 2/1994 | Calvert et al. |
| 5,600,781 | A | 2/1997 | Root et al. |
| 5,644,736 | A | 7/1997 | Healy et al. |

(Continued)

FOREIGN PATENT DOCUMENTS

| EP | 0 463 251 | 1/1992 |
| JP | 2003-271482 | 9/2003 |

(Continued)

OTHER PUBLICATIONS

EPO Communication with Supplementary European Search Report, Mar. 24, 2009, application No. 06759998.5, Applicant: Tranxition Corporation, 4 pages.

(Continued)

*Primary Examiner* — Chun Cao
(74) *Attorney, Agent, or Firm* — Ascenda Law Group, PC

(57) ABSTRACT

A method and system for a target to adopt the personality of a source without loading the personality information of the source onto the target is provided. The personality system extracts personality information from the source and stores the personality information on a removable storage medium. The storage medium is then connected to the target. The personality system intercepts requests of the target to retrieve personality information, which but for the interception would be serviced based on personality information of the target. When a request is intercepted, the personality system retrieves the personality information from the connected storage medium, rather than from the personality information of the target. The personality system then replies to the request with the retrieved personality information.

28 Claims, 6 Drawing Sheets

(56) References Cited

U.S. PATENT DOCUMENTS

| | | |
|---|---|---|
| 5,758,071 A | 5/1998 | Burgess et al. |
| 5,765,173 A | 6/1998 | Cane et al. |
| 5,831,608 A | 11/1998 | Janay et al. |
| 5,832,274 A | 11/1998 | Cutler et al. |
| 5,835,913 A | 11/1998 | Leavitt et al. |
| 5,867,714 A | 2/1999 | Todd et al. |
| 5,875,327 A | 2/1999 | Brandt et al. |
| 6,066,182 A | 5/2000 | Wilde et al. |
| 6,110,229 A | 8/2000 | Yamaguchi et al. |
| 6,151,608 A | 11/2000 | Abrams |
| 6,161,176 A | 12/2000 | Hunter et al. |
| 6,182,212 B1 | 1/2001 | Atkins et al. |
| 6,292,889 B1 | 9/2001 | Fitzgerald et al. |
| 6,330,572 B1 | 12/2001 | Sitka |
| 6,728,877 B2 | 4/2004 | Mackin et al. |
| 6,880,051 B2 | 4/2005 | Timpanaro-Perrotta |
| 7,175,078 B2 | 2/2007 | Ban et al. |
| 7,293,170 B2 | 11/2007 | Bowler et al. |
| 7,346,766 B2 | 3/2008 | Mackin et al. |
| 2002/0135613 A1 | 9/2002 | O'Hara |
| 2004/0073787 A1 | 4/2004 | Ban et al. |
| 2004/0128400 A1* | 7/2004 | Srinivasan et al. ............ 709/250 |
| 2005/0108297 A1 | 5/2005 | Rollin et al. |
| 2005/0210160 A1 | 9/2005 | Chen et al. |
| 2007/0294523 A1 | 12/2007 | Bowler et al. |

FOREIGN PATENT DOCUMENTS

| | | |
|---|---|---|
| WO | WO-95/17715 | 6/1995 |
| WO | WO-00/65438 | 11/2000 |
| WO | WO-00/68816 | 11/2000 |

OTHER PUBLICATIONS

IBM, "NetView Installation and Administration Facility/2," IBM Technical Disclosure Bulletin, Feb. 1, 1995, 2 pages, vol. 38, No. 2, IBM, New York.

International Search Report for PCT/US00/11140: Mailed Nov. 28, 2000; Applicant Tranxition Corporation et al., (4 pages).

International Search Report for PCT/US02/05388: Mailed Oct. 28, 2003; Applicant Tranxition Corporation, (4 pages).

PCT International Search Report mailing date Jun. 15, 2007, application No. PCT/US06/19036, Applicant: Tranxition Corporation, 4 pages.

Sanchez, F., "Excerpt from Installwatch," Online Version 0.6.3, http://www.asic-linux.com.mx/{izto/checkinstall/files/source/installwatch-0.6.3.tar.gz>, 11 pages [Retrieved from Internet on Dec. 8, 2008].

* cited by examiner

CHANGING THE PERSONALITY OF A DEVICE BY INTERCEPTING REQUESTS FOR PERSONALITY INFORMATION

CROSS-REFERENCE TO RELATED APPLICATION(S)

This application is a continuation of Ser. No. 11/847,024 filed Aug. 29, 2007, which is a continuation of U.S. patent application Ser. No. 11/249,750 filed Oct. 13, 2005, which claims the benefit of U.S. Patent Application No. 60/688,226 entitled "Method for Virtualizing a Computer Personality on an External Device," filed on Jun. 6, 2005, which applications are hereby incorporated by reference.

BACKGROUND

Computer users configure their computers in order to most efficiently and comfortably perform typical tasks. For example, a computer user typically sets up favorites in an Internet browser to enable easy navigation to often-visited Internet sites. Similarly, a user sets wallpaper to suit their preference, along with adjustments such as mouse speed and sensitivity. The favorites and wallpaper settings are referred to as configuration settings. A configuration setting can be global to the computer in the sense that all applications executing on the computer share that same configuration setting, or it can be specific to an application or group of applications. For example, a configuration setting that indicates the base color for a window may be global, whereas a configuration setting that indicates to automatically correct a spelling error may be specific to a word processing application. In addition to establishing the configuration settings of a computer, a user may also create and maintain information (e.g., documents and data) in files relating to the tasks for which the user is using the computer. This collection of configuration settings and files is referred to as personality information and represents the personality of the computer or other device.

When a computer user needs to use a computer other than their own, the user loses both the ease of use represented by the configuration settings and the information in the files available on their computer. This makes it difficult to do meaningful computer work remotely. One solution is the use of portable (e.g., laptop) computers that can be carried when the user travels. This solution has disadvantages that include the inconvenience of transport due to weight, fragility of the device, and cost of the device and accessories. Another disadvantage is the inconvenience related to security measures employed in airports that require unpacking and repacking the portable computer every time a user goes through a security checkpoint.

Another solution to the problem is to copy the configuration settings and files to the other computer. A disadvantage, however, of this solution is privacy. The user may have very sensitive information (e.g., passwords) represented as configuration settings or files and may not be comfortable storing such information on another computer. Although it may be possible to delete such information from the other computer after its use, such deletion may not always be possible. For example, if the computer loses power after the configuration settings and files have been copied to the hard drive, then the user may not be able to delete the configuration settings and files from the hard drive after power is restored. In such a case, the next user of the computer system may be able to access the sensitive information.

DETAILED DESCRIPTION

Figure 1:
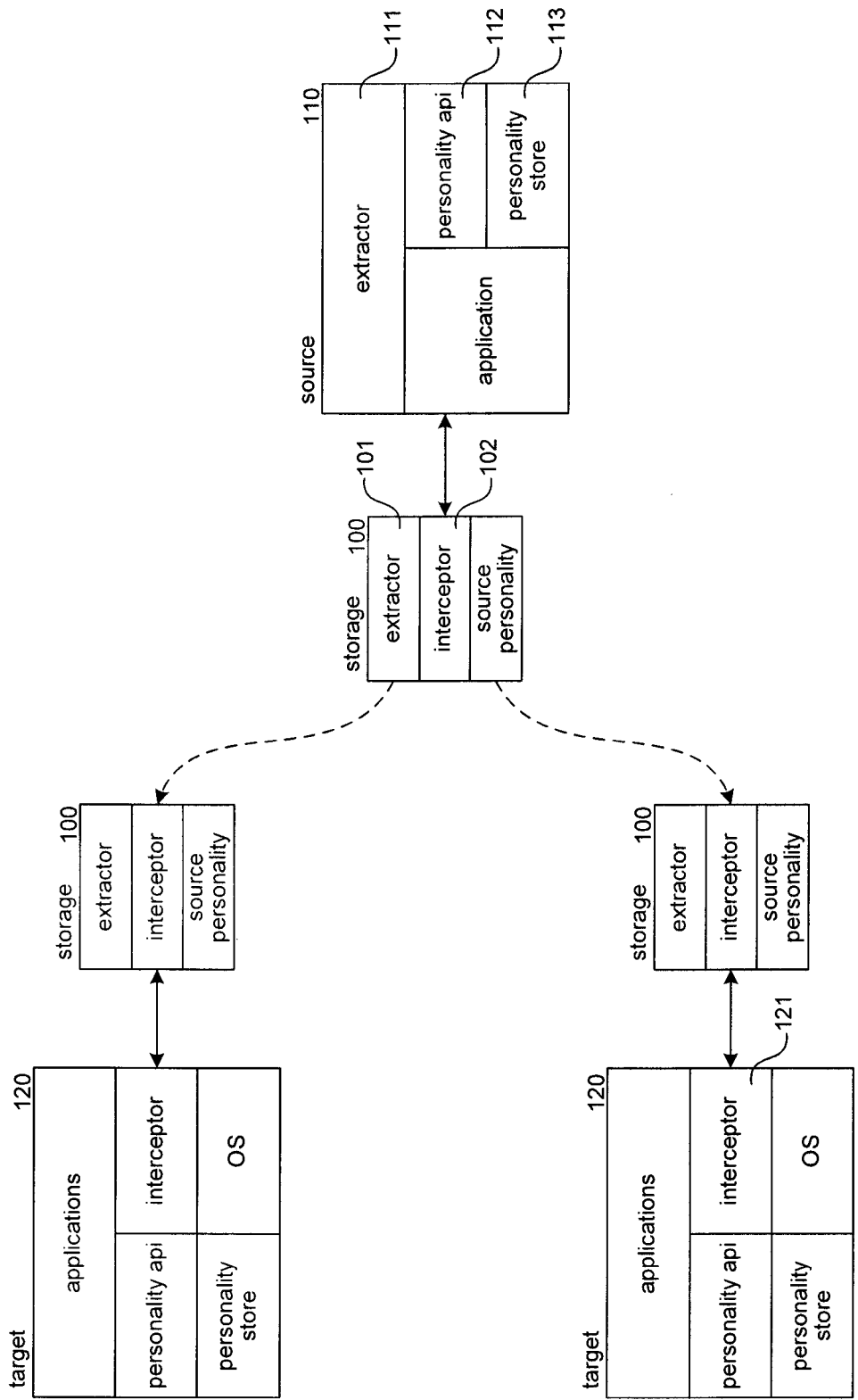
FIG. 1 is a block diagram that illustrates components of the personality system in one embodiment.

A method and system for a target to adopt the personality of a source without loading the personality information of the source onto the target is provided. In one embodiment, the personality system extracts personality information from the source and stores the personality information on a removable storage medium, such as a Universal Serial Bus ("USB") device. The personality information may include configuration settings (e.g., settings of a word processing program) of the source. The source and target may be computing devices such as a personal computer, personal digital assistant, cell phone, digital camera, other consumer electronic device, and so on. The storage medium is then connected to the target. The personality system intercepts requests of the target to retrieve personality information, which but for the interception would be serviced based on personality information of the target. When a request is intercepted, the personality system retrieves the personality information from the connected storage medium, rather than from the personality information of the target. The personality system then replies to the request with the retrieved personality information. The personality system preferably does not write any personality information to the disk drives or other persistent storage of the target; rather, the personality information is retrieved as needed from the removable storage medium and provided as in-memory data, which is typically not available after the requesting process executing on the target terminates. Because the personality system does not store personality information to persistent storage of the target, normal reticence, on the part of visiting users who want to use a target with their personality information but fear that their personality information may be compromised, is reduced. In this way, the personality system causes the target to adopt the personality of the source without persistently loading the personality information of the source onto the target.

In one embodiment, the personality system may include an extraction component and an adoption component. These components may be stored on the storage medium. When the storage medium is first connected to a device (i.e., source or target), an auto execute component from the storage medium may prompt the user to indicate whether the device should be used as a source or target, that is, whether the personality information of the device should be extracted and stored on the storage medium or whether the device should adopt the personality based on the personality information stored on the storage medium. When the user selects to use a device as a source, the extraction component is loaded from the storage medium and executed by the device. The extraction component may use various techniques to extract personality information from the device such as those described in U.S. Pat. No. 6,728,877, entitled "Method and System for Automatically Transitioning of Configuration Settings among Computer Systems," which is hereby incorporated by reference. The extraction component then stores the personality information on the storage medium. When the storage medium is then connected to another device, the auto execute component again prompts the user to indicate whether the device should be used as a source or target. When the user selects to use the device as a target, the adoption component is loaded from the storage medium and executed by the device. The adoption component may install interception code onto the target to intercept requests by the target for personality information of the target. For example, the personality information of the target may be stored in a system registry that provides an application programming interface ("API") for storing and retrieving personality information. The adoption component may identify locations within the functions of the application programming interface and install transfer instructions to transfer execution from the function of the application programming interface to code of the adoption component. When an application executing on the target requests personality information by invoking a function of the application programming interface, the invoked function executes the transfer instruction to transfer control to the adoption component. The adoption component retrieves the personality information of the source from the storage medium and then replies to the request by returning from the invoked function with the retrieved personality information.

In one embodiment, the personality system stores the personality information on the storage medium in a canonical form. The canonical form may be neutral in the sense that it is independent of any application program and independent of the operating system under which an application program executes. For example, the configuration settings of a word processing program (e.g., Microsoft Word), such as default font type, may be stored in a format that is independent of the word processing program through which the configuration settings were specified and used on the source. When the storage medium is connected to a target that uses a different word processing application (e.g., StarOffice), the personality system may convert the configuration settings from the canonical form to a target-specific form that can be used by the applications of the target. As another example, the source and target may execute different operating systems. In such a case, the personality system stores personality information of the operating system of the source in a canonical form on the storage medium and converts the personality information to a target-specific form when accessed by the target. For example, the personality information of a source computer that operates under Microsoft Windows may include a wallpaper image. Once extracted, the wallpaper image can be part of the personality adopted by a target computer that operates under an Apple or Linux operating system. The canonical form may be a neutral form or may default to the form specific to an application or an operating system.

FIG. 1 is a block diagram that illustrates components of the personality system in one embodiment. The personality system in this embodiment includes an auto execute component, an extraction component 101, and an interceptor component 102. The components are stored on a storage medium 100. When the storage medium is connected to a device, such as source 110, the auto execute component automatically executes and prompts the user to indicate whether to extract the personality of the source or to have the source adopt a personality based on personality information stored on the storage medium. When the user indicates to extract the personality, the personality system loads the extraction component from the storage medium onto the source as extraction component 111. The source includes a personality store 113 that contains the personality information of the source. The source also includes a personality API 112 through which an application executing on the source can access the personality information. The operating system of the source may allow multiple users to log onto the source and may maintain separate personality information for each user (e.g., preferred font type) along with personality information that is common to all users. The extraction component may allow the user to specify the user whose personality information is to be extracted. The extraction component may provide a user interface through which the user can specify which personality information is to be extracted. For example, the user may specify to extract all the personality information (e.g., for all applications and the operating systems), the personality information for a specific application (e.g., an Internet browser), or specific personality information (e.g., Internet browser favorites). For the Microsoft Windows operating system, the a personality store may include the system registry that is accessible via the registry API that includes the following functions:

RegCreateKey( )—creates a new registry key
    RegDeleteKey( )—deletes a registry sub-key, including all its values
    RegDeleteValue( )—removes a value from a registry key
    RegEnumKey( )—enumerates sub-keys of a registry key
    RegEnumValue( )—enumerates values for a registry key
    RegSetValue( )—sets the data for a value in a registry key The extraction component retrieves the personality information using the personality API. The extraction component then stores the extracted personality information on the storage medium. The extraction component may convert the personality information into a canonical form before storing the information on the storage medium.

The user may then disconnect the storage medium 100 from the source and connect the storage medium to a target 120. When the storage medium is connected to the target, the auto execute component may be launched and prompt the user to indicate whether the user wants to use the device as a target or source. When the user specifies to use the device as a target, the personality system then loads the interceptor component onto the target as an interceptor component 121. The interceptor component then installs code to intercept requests for personality information and to redirect the requests to the interceptor component so that the requests can be serviced from the personality information of the storage medium. For example, the interceptor component may direct the operating system of the target to load an interceptor dynamic link library ("DLL") as part of each process that it creates and to execute a certain function of the interceptor DLL before any other code of the process executes. The function of the interceptor DLL that is executed first may scan the address space of the process to locate the personality API of the operating system. The interceptor DLL may then insert a jump instruction within each function of the personality API to transfer control to the interceptor component. When the created process invokes a function of the personality API, the jump instruction will cause control to be transferred to the interceptor component, which retrieves the appropriate personality information from the storage medium and returns the retrieved personality information, rather than the personality information from the personality store of the target. One skilled in the art will appreciate that many different techniques may be used for intercepting requests for personality information. For example, some APIs provide a hooking mechanism through which hooks can be registered (e.g., via a callback) and passed control before the function of the API is performed. In such a case, the hooking function may notify the API not to perform its function. As another example, an API may provide a table that contains pointers to functions (e.g., a virtual function table of an object), and the interceptor DLL may replace those pointers with pointers to code within the interceptor component.

Figure 2:
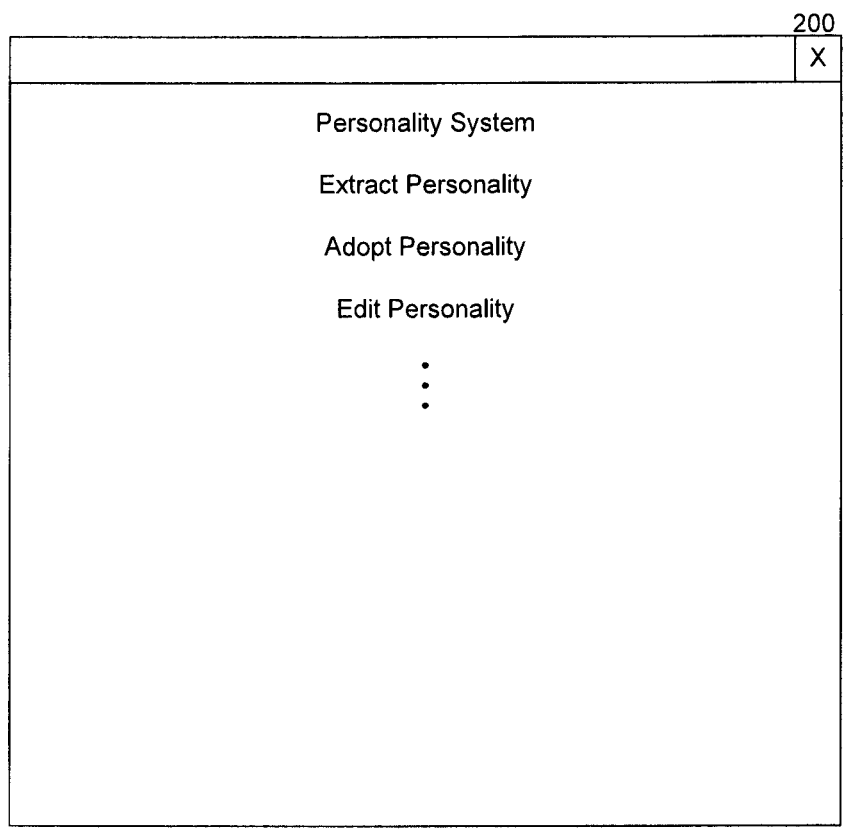
FIG. 2 is a diagram that illustrates a display page of the personality system in one embodiment.

FIG. 2 is a diagram that illustrates a display page of the personality system in one embodiment. The display page 200 may be displayed when the auto execute component executes when the storage medium is connected to the device. The display page may provide various options such as to extract the personality of the device, to adopt the personality stored on the storage medium, to edit the personality stored on the storage medium, to synchronize the personality information of the storage medium with the personality information of the device, and so on. The extraction and adoption options have been described above. The editing of personality information may allow the user to view and change the personality information stored on the storage medium. The synchronization of personality information may allow the personality information of the storage medium to be updated based on the current personality information of the device. Alternatively, the synchronization of personality information may allow the personality information stored on the device to be updated based on the personality information of the storage medium.

In an alternate embodiment, the personality information of a source may not be extracted until a target requests the personality information. For example, when the interceptor component intercepts a request of a target for personality information, rather than retrieving information of the storage medium that has been previously extracted from the source, the interceptor component may forward the request via a network to an extraction component executing on the source. When the extraction component receives the request, it retrieves the appropriate personality information from the personality store of the source and sends a reply via the network to the interceptor component of the target. The interceptor component then returns the provided personality information to the application.

In one embodiment, the storage medium may be part of a server that is connected to sources and targets via a network, such as the Internet. An extraction component of the personality system executing on a source can then extract the personality information of the source and send the personality information to the server for storage on the storage medium. An adoption component of the personality system executing on a target can request the server to provide the personality information of a source that is stored on the storage medium of the server.

In one embodiment, the personality system stores the personality information in a neutral format as a set of eXtensible Markup Language ("XML") files. In other embodiments, the personality system may store the personality information in a neutral format as a set of indexed master files with data converted to text, as a B*tree database, and so on. In one embodiment, the personality system may organize the personality information by application type, setting description, and setting state. An example of this organization follows:

Application Type: Word Processor
  Setting: Screen Background Color—RGB 1-100
    Setting State Red: 100
    Setting State Green: 25
    Setting State Blue: 25
  Setting: Font Name
    Setting State: Arial
  Setting: Font Description
    Setting State Serif: no
    Setting State Width: narrow
  Setting: Font Size
    Setting State point: 12

The computing devices on which the personality system may be implemented may include a central processing unit, memory, input devices (e.g., keyboard and pointing devices), output devices (e.g., display devices), and storage media (e.g., disk drives). The memory and storage media are computer-readable media that may contain instructions that implement the personality system. The removable storage medium that contains personality information may include a USB device, removable disk storage, optical storage medium, flash E-PROM, and so on. In addition, the data structures and message structures may be stored or transmitted via a data transmission medium, such as a signal on a communications link. Various communications links may be used, such as the Internet, a local area network, a wide area network, or a point-to-point dial-up connection.

The personality system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and so on. The personality system may also be implemented on computing devices such as cell phones, personal digital assistants, consumer electronics, home automation devices, and so on.

The personality system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
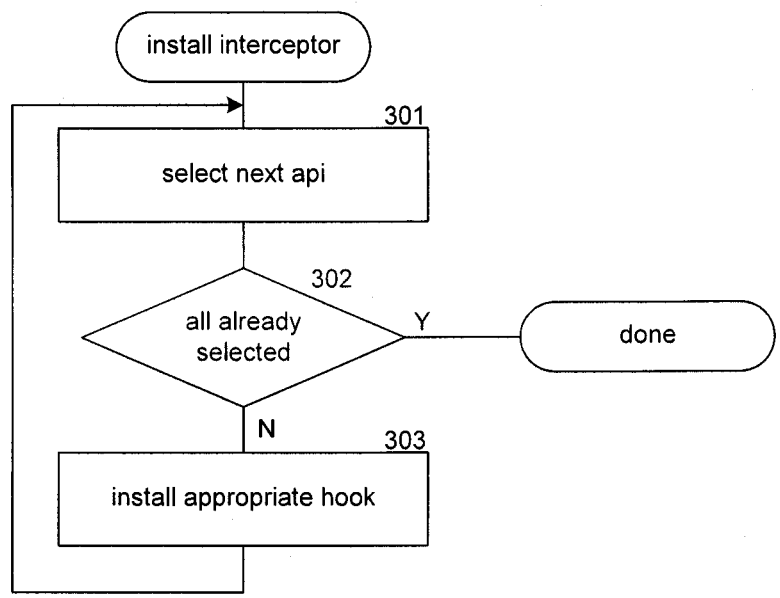
FIG. 3 is a flow diagram that illustrates the processing of the install interceptor component in one embodiment.
Figure 4:
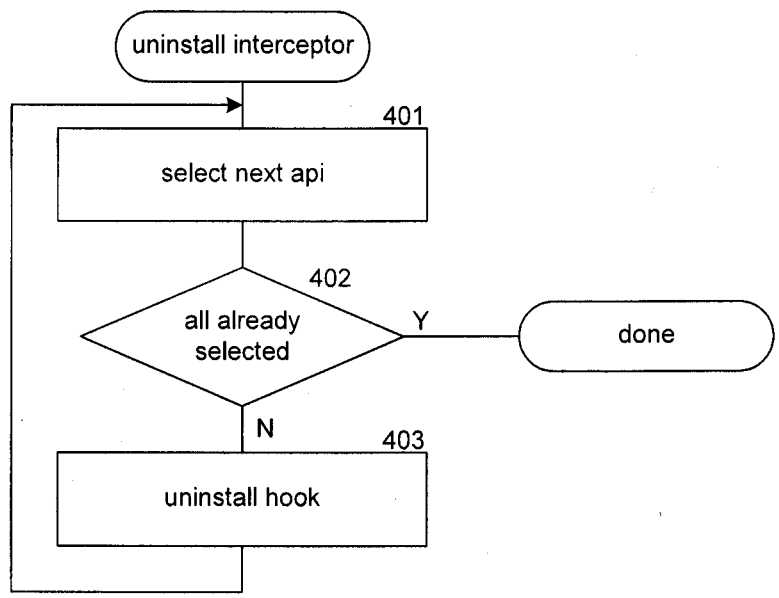
FIG. 4 is a flow diagram that illustrates the processing of the uninstall interceptor component in one embodiment.
Figure 5:
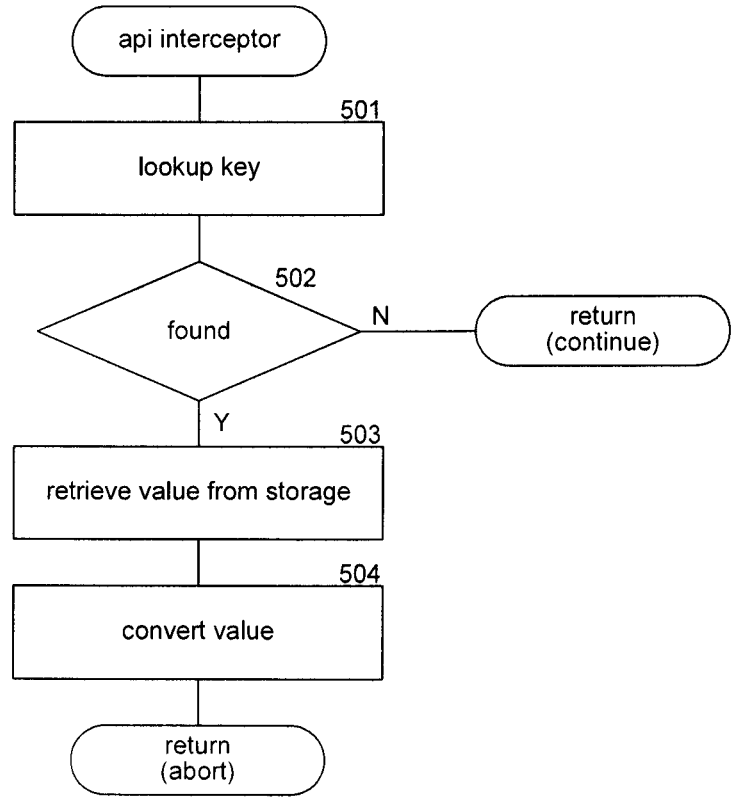
FIG. 5 is a flow diagram that illustrates the processing of the interceptor code in one embodiment.

FIGS. 3-5 are flow diagrams that illustrate the processing of the interceptor component in one embodiment. FIG. 3 is a flow diagram that illustrates the processing of the install interceptor component in one embodiment. The install interceptor component uses an interception mechanism appropriate to the target to intercept accesses of the target to personality information. In block 301, the component selects the next personality API of the target. The term API may refer to a collection of functions or a single function within a collection. In decision block 302, if all the personality APIs of the target have already been selected, then the component completes, else the component continues at block 303. In block 303, the component installs the appropriate interception mechanism for the selected personality API and then loops to block 301 to select the next personality API.

FIG. 4 is a flow diagram that illustrates the processing of the uninstall interceptor component in one embodiment. If the interception mechanism is not process-specific, then the interception mechanism may not be automatically removed from memory when a process is terminated. In such a case, the target may need to be powered down to remove the interception mechanism from memory. If the user cannot power down the target, the personality system may invoke the uninstall interceptor component to remove the interception mechanism. In block 401, the component selects the next personality API that was intercepted. In decision block 402, if all the personality APIs have already been selected, then the component completes, else the component continues at block 403. In block 403, the component uninstalls the interception mechanism for the selected personality API and then loops to block 401 to select the next personality API.

FIG. 5 is a flow diagram that illustrates the processing of the interceptor code in one embodiment. The interceptor code is executed when a personality API is intercepted. The interceptor code performs the function of the intercepted personality API by accessing the personality information of a source. The personality information to be accessed may be identified by a key. In block 501, the component looks up the key in the personality information extracted from the source. In decision block 502, if the key is not found, then the component returns with an indication that the intercepted API should continue its normal processing, else the component continues at block 503. The intercepted API should continue its normal processing because the personality information that the application is requesting was not extracted from the source. In block 503, the component retrieves the value from the source personality information for the key. In block 504, the component converts the retrieved value to the appropriate format for the target. The component then returns an indication indicating that the intercepted API should not perform its normal processing because the value for the key was found in the personality information of the source.

Figure 6:
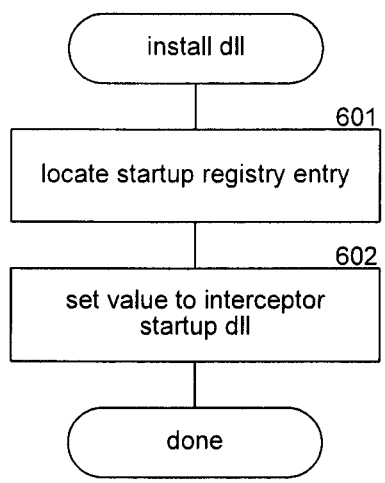
FIG. 6 is a flow diagram that illustrates the processing of an install DLL component in one embodiment.

FIG. 6 is a flow diagram that illustrates the processing of an install DLL component in one embodiment. The install DLL component installs a startup interceptor DLL that may be loaded as part of each created process and that executes before other code of the process. The Microsoft Windows operating system includes a registry entry that contains the name of a DLL that is to be loaded as part of each process and executed before other code of the process. This component may be invoked by the personality system when a user indicates to adopt a personality based on the personality information of a newly connected storage medium. The install DLL component sets that registry entry to point to the startup interceptor DLL. Although this is changing the registry of the target, it is not changing it to contain personality information of the source. In block 601, the component locates the startup interceptor DLL of the registry entry in the system registry. In block 602, the component sets the value of that registry entry to point to the startup interceptor DLL. The component then completes.

Figure 7:
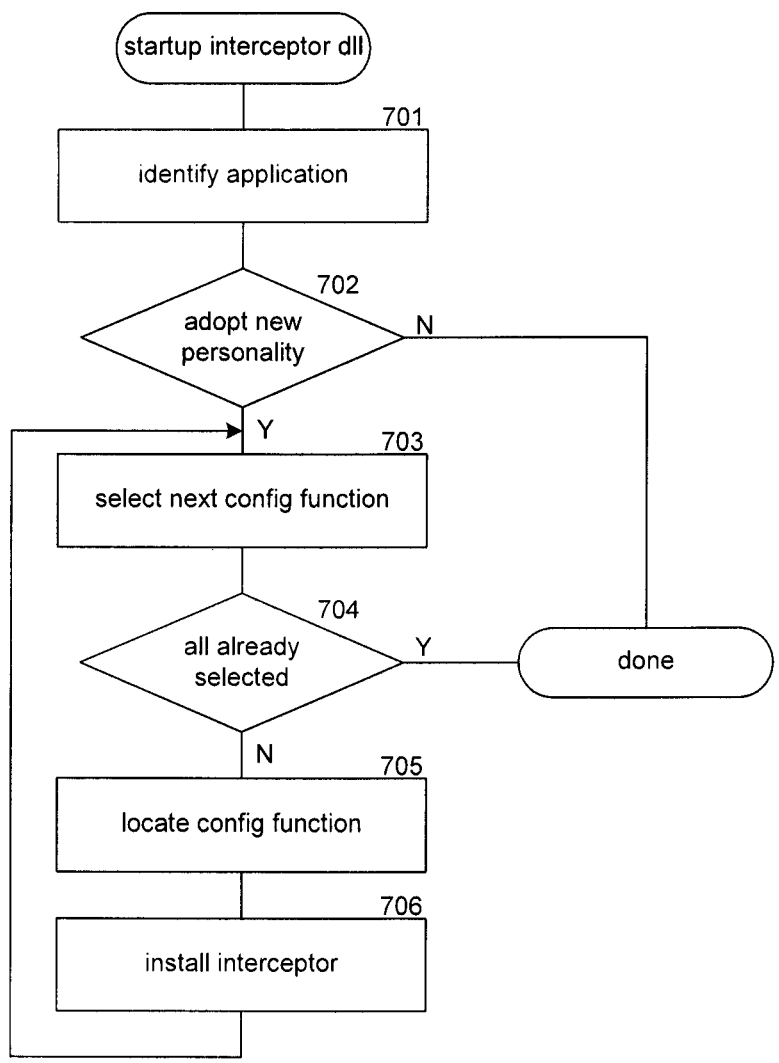
FIG. 7 is a flow diagram that illustrates the processing of the startup interceptor DLL in one embodiment.

FIG. 7 is a flow diagram that illustrates the processing of the startup interceptor DLL in one embodiment. The startup interceptor DLL is invoked before other code of the process is executed. In block 701, the component identifies the application that is to execute as the process. In decision block 702, if the application should adopt the personality of the source, then the component continues at block 703, else the component completes. An application may not have its personality modified if, for example, the storage medium contains no personality information for that application or if for some other reason the application is not to have its personality modified. In block 703, the component selects the next function or API to be intercepted. In decision block 704, if all the functions have already been selected, then the component completes, else the component continues at block 705. In block 705, the component locates the function to be intercepted. The component may locate the function by scanning the code of the address space of the process looking for identifying information (e.g., sequence of instructions) for the function. Alternatively, the component may include an invocation to each function that is not actually executed and derive the location of the function from that invocation as established by the loader. In block 706, the component installs the code to intercept the invocation to the function and then loops to block 703 to select the next function.

Figure 8:
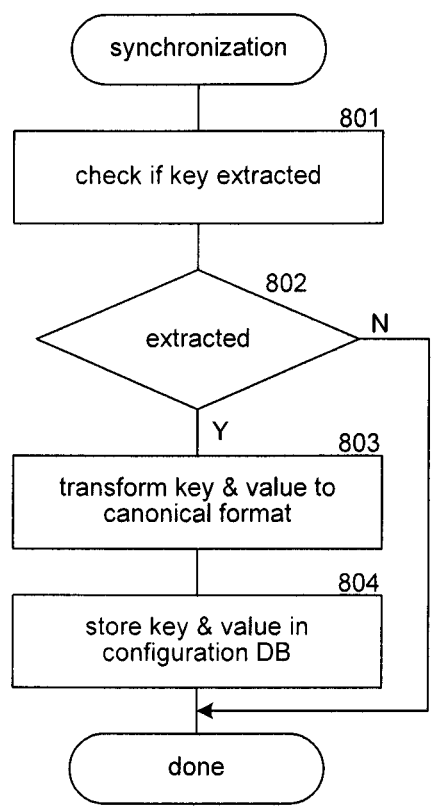
FIG. 8 is a flow diagram that illustrates the processing of a synchronization component in one embodiment.

FIG. 8 is a flow diagram that illustrates the processing of a synchronization component in one embodiment. The synchronization component executes on a source and updates a storage medium whenever personality information of the source has been modified. Thus, the storage medium will contain the current personality information of the source when the user disconnects the storage medium from the source. This component may be registered as a callback to be invoked whenever personality information is modified. The component is passed the key for the personality information along with its new value. In block 801, the component checks if the personality information identified by the passed key is to be extracted. In decision block 802, if the personality information to be modified is to be extracted, then the component continues at block 803, else the component completes. In block 803, the component transforms the key and value to a canonical form. In block 804, the component stores the key and value as personality information on the storage medium and then completes. Alternatively, the component may update the source to keep it synchronized with the storage medium or may update both depending on what has changed on the source or storage medium.

From the foregoing, it will be appreciated that specific embodiments of the invention have been described herein for purposes of illustration, but that various modifications may be made without deviating from the spirit and scope of the invention. The targets can include publicly accessible kiosks or computers (e.g., at a library), automated teller machines, terminals through which airline tickets can be purchased, and so on. In addition, one skilled in the art will appreciate that the personality information that is adopted by a target need not be extracted from a source. For example, a company may distribute storage media to its employees that contain personality information that the company wants its employees to use when using a non-company computer system. In addition, the personality system may be adapted to implement the preferences of an organization. For example, if a company does not want certain highly sensitive personality information to be made available when an employee uses a third-party computer, the company may modify the personality system to prevent the extraction of such information. In addition, one skilled in the art will appreciate that the personality system may be stored persistently on devices rather than loaded from the removable storage medium that is used for storing the personality information. The personality information on a storage medium may be encrypted and decrypted by the extraction component and adoption components, respectively, to ensure the privacy of the personality information. Accordingly, the invention is not limited except as by the appended claims.

We claim:

1. A method for a target to adopt a personality of a source, the target having personality information, the method comprising:

providing a storage medium containing personality information of the source;

intercepting requests to retrieve personality information of the target, wherein the intercepting of requests includes installing a startup interceptor dynamic link library (DLL) that is to be loaded as part of each process and that executes before other code of the process; and when a request is intercepted, retrieving personality information stored on the provided storage medium; and replying to the request with the retrieved personality information stored on the storage medium, rather than the personality information of the target.

2. The method of claim 1 wherein the personality information includes configuration information.

3. The method of claim 1 wherein when the storage medium is installed on the target, the method further comprising:
loading a program from the storage medium onto the target for intercepting the requests.

4. The method of claim 1 wherein the personality information stored on the storage medium is in a canonical form.

5. The method of claim 4,
further comprising:
converting the retrieved information from the canonical form to a target-specific form prior to replying to the request.

6. The method of claim 1, further comprising:
injecting code into the process to intercept requests to retrieve personality information for each process created at the target.

7. The method of claim 1 wherein the personality information of the storage medium is not copied to a personality information store of the target.

8. The method of claim 1 wherein the personality information of the storage medium is not copied to a persistent storage medium of the target.

9. The method of claim 1 wherein the storage medium is a USB device.

10. A non-transitory storage medium storing a set of instructions which when executed by a processor cause the processor to:
extract personality information from a source;
store the extracted personality information on the storage medium;
enable the target to adopt the personality of the source by using the personality information stored on the storage medium as the personality of the target without storing the personality information on a persistent storage medium of the target; and
intercept requests to retrieve personality information of the target, wherein the interception of requests includes installing a startup interceptor dynamic link library (DLL) that is to be loaded as part of each process and that executes before other code of the process.

11. The non-transitory storage medium of claim 10 wherein the set of instructions further cause the processor to:
generate a reply to the request based on the personality information of the storage medium.

12. The non-transitory storage medium of claim 10 wherein the personality information is stored in a canonical form.

13. The non-transitory storage medium of claim 10, wherein the processor automatically executes the set of instructions when the storage medium is connected to the source or the target.

14. A method for a target to adopt a personality of a source, the target and the source having personality information, the method comprising:
intercepting requests to retrieve personality information of the target, wherein the intercepting of requests includes installing a startup interceptor dynamic link library (DLL) that is to be loaded as part of each process and that executes before other code of the process; and
when a request is intercepted, retrieving personality information of the source; and
replying to the request with the retrieved personality information of the source, rather than the personality information of the target, wherein the personality information of the source is not stored on to a personality information store of the target.

15. The method of claim 14 wherein the retrieving includes sending a request to the source to retrieve personality information of the source.

16. The method of claim 14 wherein the retrieving includes accessing a storage medium that contains personality information extracted from the source.

17. The method of claim 14 wherein the personality information includes configuration information.

18. The method of claim 14 wherein the retrieved personality information is in a canonical form.

19. The method of claim 14 further comprising:
converting the retrieved information from the canonical form to a target-specific form prior to replying to the request.

20. The method of claim 14, further comprising:
injecting code into the process to intercept requests to retrieve personality information for each process created at the target.

21. The method of claim 14 wherein the personality information store of the target is stored on a persistent storage medium.

22. A system for a target to adopt the personality of a source, the target having personality information, the system comprising:
a component that intercepts requests to retrieve personality information of the target wherein the component that intercepts requests is a startup interceptor DLL that is loaded as part of each process and that executes before other code of the process; and
a component that, when a request is intercepted, retrieves personality information of a source and replies to the request with the retrieved personality information of the source, rather than the personality information of the target, wherein the personality information of the source is not stored on to a personality information store of the target.

23. The system of claim 22 wherein the component that retrieves sends a request to the source to retrieve personality information of the source.

24. The system of claim 22 wherein the component that retrieves accesses a storage medium that contains personality information extracted from the source.

25. The system of claim 22 wherein the retrieved personality information is in a canonical form.

26. The system of claim 25 wherein the component that replies to the request converts the retrieved information from the canonical form to a target-specific form.

27. The system of claim 22 including a component that injects code into a process to intercept requests to retrieve personality information.

28. The system of claim 22 wherein the personality information store of the target is stored on a persistent storage medium.

* * * * *